Oct. 9, 1956
A. KOCH
2,765,819
COPYING LATHE FOR SHOE LASTS AND OTHER IRREGULAR BODIES
Filed Dec. 19, 1951
4 Sheets-Sheet 4
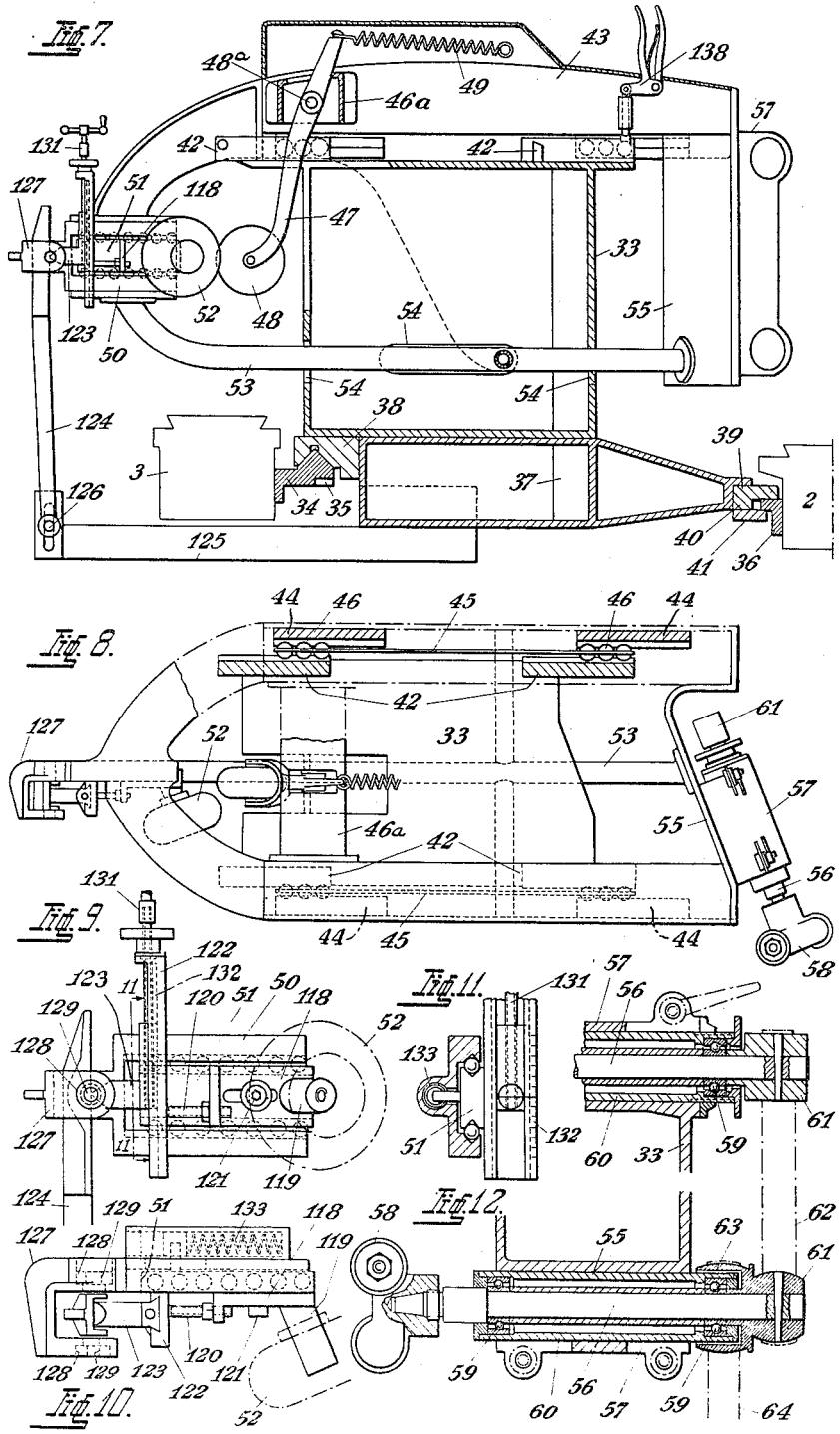
INVENTOR:
AUGUST KOCH United States Patent Office 2,765,819
Patented Oct. 9, 1956

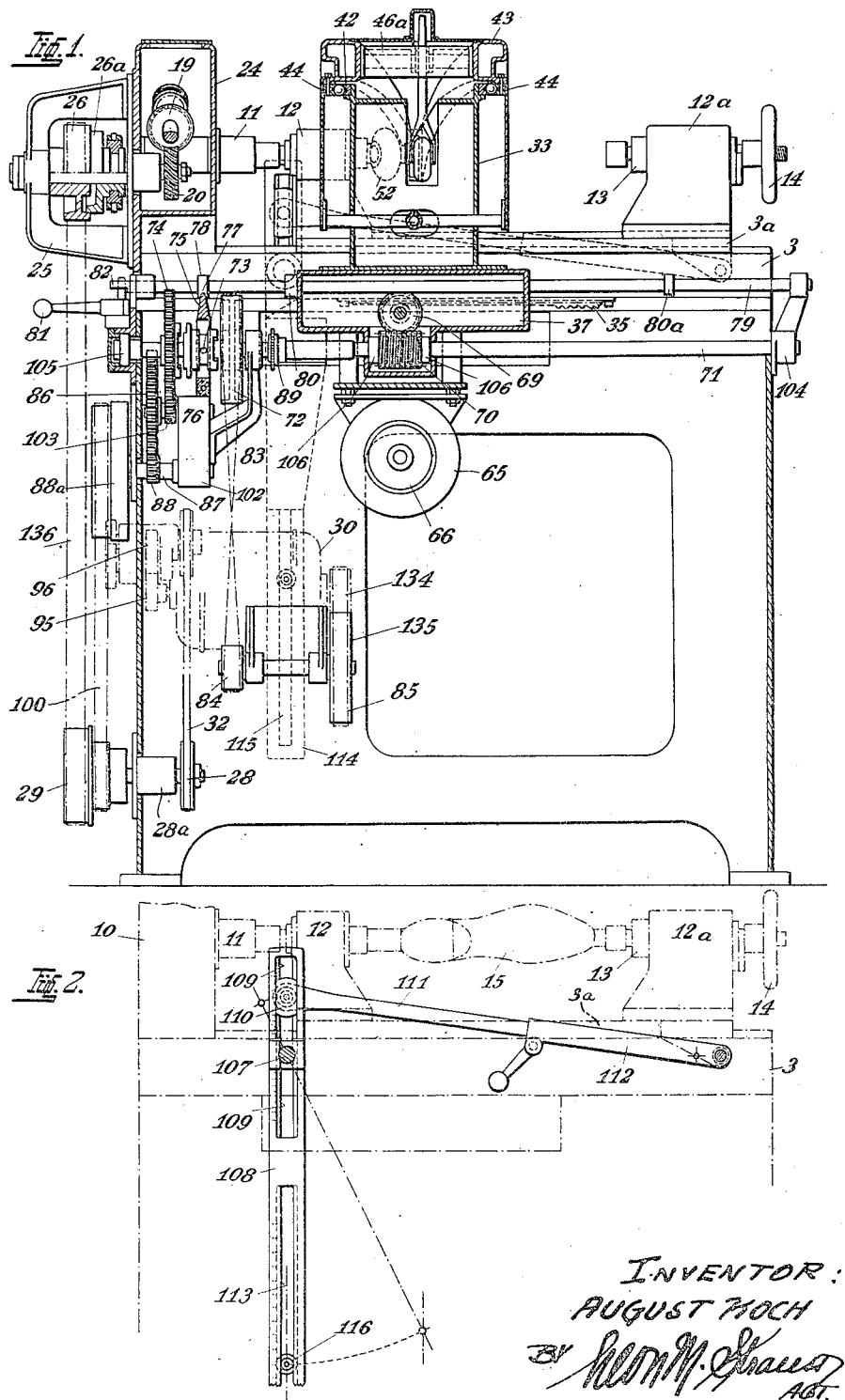

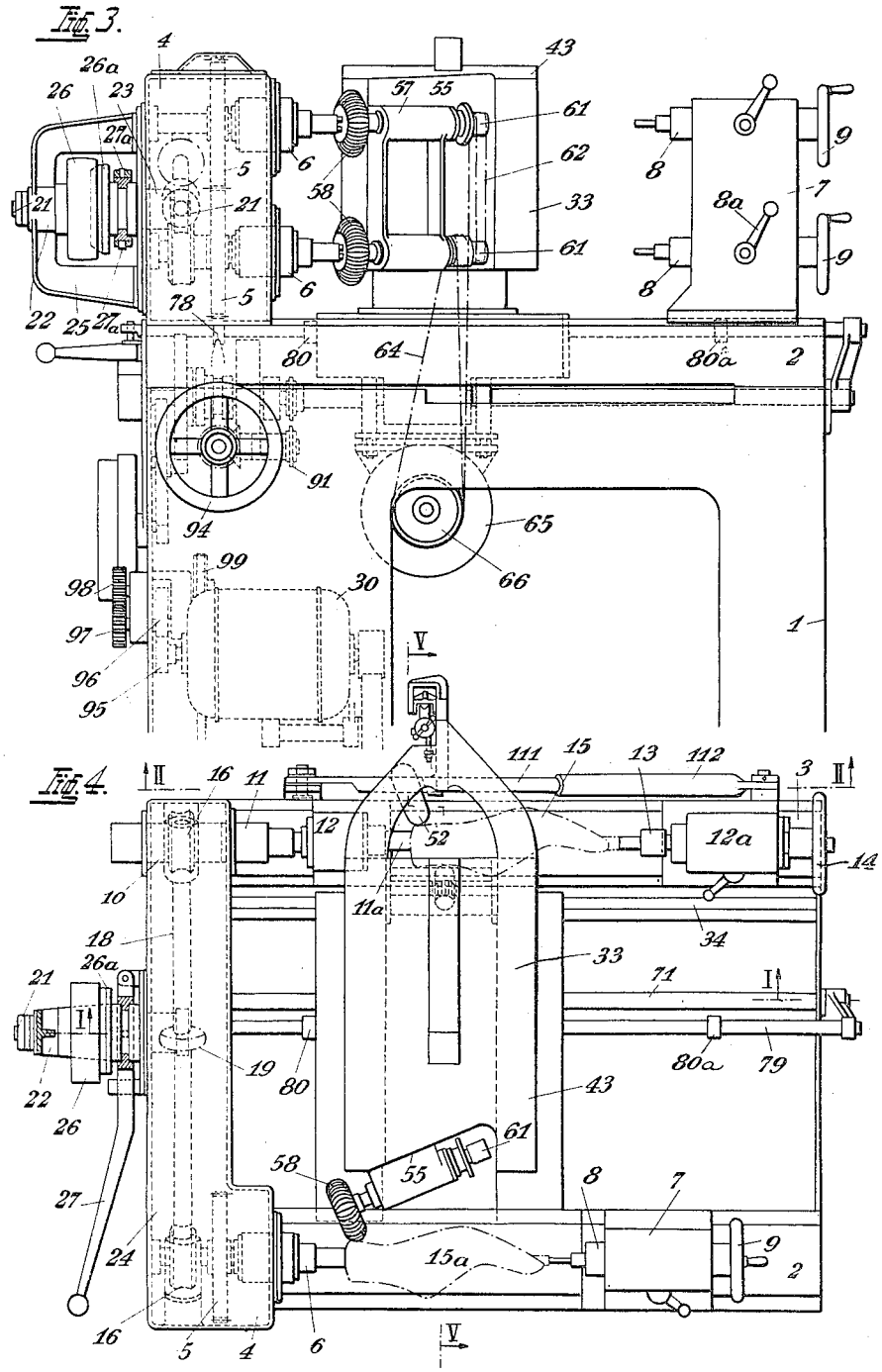

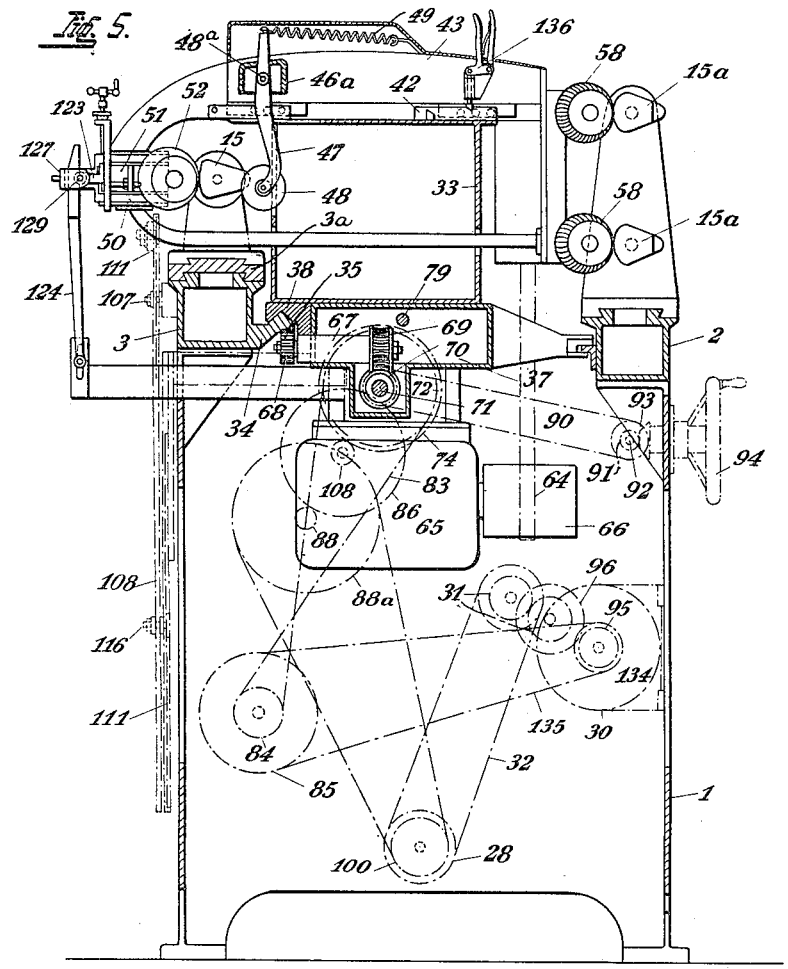
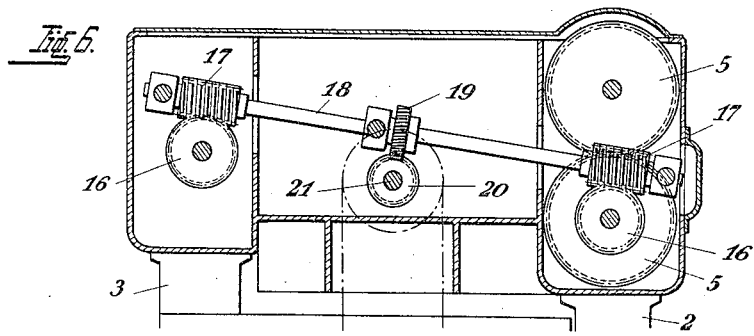

2,765,819

COPYING LATHE FOR SHOE LASTS AND OTHER IRREGULAR BODIES

August Koch, Munsingen, Switzerland, assignor to Martignoni, Koch & Cie. A. G., Munsingen, Switzerland Application December 19, 1951, Serial No. 262,409

Claims priority, application Switzerland April 7, 1951

5 Claims. (Cl. 142—7)

Copying lathes equipped with either an oscillating frame or with individual rockers which are arranged side by side or alternately behind each other, have been and are being used for the manufacture of shoe lasts and other irregular bodies. In these copying lathes equipped with oscillating frames the pattern or model and the work pieces are clamped and then guided towards the cutter heads and copying disk by a pendulum movement. These last mentioned copying lathes all produce greater or smaller distortions or deformations due to the arcuate movement of the pendulum. A guide adapted to produce a corrected straight line and with a pendulum movement must afford several flat-arc deflections and requires several turning points. Such a guide is impractical when greater or smaller shoe lasts than the model must be manufactured in pairs.

This invention relates to a copying lathe for shoe lasts and irregular shaped bodies which is predicated on rotation of a rotatably supported model and of work pieces which are each supported on V-shaped guides, whereby model and work pieces are directly operated together. Provision is made on the lathe for a transportation slide longitudinally movable between the V-shaped guides and provided with a longitudinally movable copying slide located transversely thereto. The copying slide is provided with a feeler wheel engaging the model and with a cutter head for working the work piece.

The cutter heads are adjusted according to the model by the cooperation between the slide and the feeler wheel and the cutter heads are movable transversely and horizontally.

A form of construction of such a copying lathe is illustrated in the drawings.

Fig. 1 shows a longitudinal sectional view of the copying lathe taken on line I—I of Fig. 4.

Fig. 2 shows the longitudinal proportions in sectional view taken on line II—II of Fig. 4.

Fig. 3 shows a front elevation with the milling tools and their drive.

Fig. 4 shows a plan view of the lathe and of the copying slide.

Fig. 5 shows a section view through the lathe taken on line V—V of Fig. 4.

Fig. 6 shows a side elevation of the drive of the model and work piece spindles.

Fig. 7 shows the regulation mechanism of the copying slide.

Fig. 8 is a plan view of the regulation mechanism of Fig. 7;

Figs. 9 and 10 show the regulation mechanism drawn to a larger scale.

Fig. 11 is a sectional view through the V-shaped guides and taken on line II—II of Fig. 9.

Fig. 12 is a sectional view through the cutter head spindles and their drives.

The lathe is provided with a box-like hollow housing 1, on which are mounted two parallel V-shaped guides 2 and 3. V-shaped guide 2 is provided at one end with a headstock 4 supporting two rotatable spindles 6, driven by gearwheels 5, and at the other end with a tailstock 7 having two clamping stocks 8 adjustable by means of a pair of hand wheels 9, whereby the work pieces are clamped between the spindles 6 and the clamping stocks 8. The V-shaped guide 3, mounted parallel to V-shaped guide 2, is also provided at one end with a headstock 10 including a rotatably seated spindle nose 11 and with a slide plate 39 on which a bearing stock 12 and a tailstock 12a with a clamping stock 13 are mounted which clamping stock 13 is axially displaceable by hand-wheel 14 and is therefore adjustable. Model last 15 is rotatably secured and held between headstock 10 and clamping stock 13 and rotating last 15 can be longitudinally displaced by moving slide plate 3a.

Spindles 11 and 6 are provided with worm gears 16 in each of which a worm 17 meshes on the upper side, such worms are supported on a common shaft 18. Shaft 18 also supports a helical gear 19 under which another helical gear 20 meshes. Gear 20 is securely connected to a horizontal shaft 21. The horizontal shaft 21 is rotatably seated in bearings 22, 23 (Fig. 3) of the protecting housing 24, whereby the outer bearing 22 is connected to the protecting housing by means of yoke 25. Flange coupling 26 is rotatably mounted on shaft 21. Coupling 26 has a tapered recess in which a sleeve coupling 26a is engageable. Sleeve coupling 26a is movable on shaft 21 by means of lever 27 and it is non-rotatably connected to shaft 21 although axially movable so that by displacing lever 27 the shaft can be either connected to or disconnected from the coupling sleeve 26a.

It is thus possible to simultaneously either rotate or bring to a standstill the three spindles 6 and 11 by operating lever 27. Transmission system 28 provided with a belt pulley 29 is disposed below flange coupling 26 and projects outwardly from housing 1. Belt pulley 29 drives flange coupling 26 by means of a belt. The transmission system is driven by a motor 30 mounted in housing 1 by means of an intermediate gearing 31 from which belt 32 extends over a pulley portion of transmission system 28 and thereby sets its shaft in motion. A box-shaped carriage 33 is disposed between guides 2 and 3. This carriage 33 is guided along V-shaped guide 3 by guide bar 34 that is angularly shaped at the top, and a toothed rack 35, and on V-shaped guide 2 by an angularly-shaped bar 36 thereof. The lower part 37 of carriage 33 forms together with the latter an angle recess in which bar 38 is held, while on the opposite side the lower part 37 is provided with recess 39 wherein guide bars 40, 41 are secured.

The cross head 43 is guided by two bars 42 which protrude outwardly from carriage 33. The cross head 43 is frame-like and it is provided with two bars 44 which are attached thereto by screw means which protrude outwardly to thereby permit transversal reciprocatory motion of the cross head 43 on carriage 33. The guiding bars 42 on the carriage 33 together with the bars 44 on the cross head 43 are moved at both their extremities in order to permit rolling of three or more ball bearings 46 between the two rods 45, see Fig. 8. The connection between the cross head 43 and carriage 33 permits nearly frictionless transverse sliding of cross head 43 on carriage 33. The cross head 43 is substantially V-shaped and a transverse piece 46a connects the arms thereof. This connecting piece 46a forms a bearing for lever 47 which supports a countercontact wheel 48 which is adapted to engage the model article 15. The countercontact wheel 48 upon engagement with the model article 15 urges the cross head 43 toward the model article 15 by means of the extending portion of the lever 47 located above the fulcrum 48a which is secured to one end of tension spring 49 which is itself connected at the opposite end of cross head 43, see Fig. 7.

The cross head 43 is downwardly bent at the bight portion thereof and supports outwardly from said bight portion a vertically arranged guide 50 which is U-shaped in cross section. Said guide 50 is adapted to movably receive therein an adjustable counterpiece 51. Counterpiece 51 supports at one end thereof a contact wheel 52 which is also adapted to engage the model article 15. This U-shaped guide 50 is connected to a rod 53 which extends below cross head 43 and through carriage 33 up to and through front wall 55 where it is attached to thereby absorb any vibrations of the U-shaped guide 50. Two bearing holders 57 are welded on front wall 55 of the two spindles 56 and supported thereby. Each of the spindles 56 is equipped with a shaping means or cutter head 58 at one end thereof while the opposite end thereof is equipped with a pulley 61 supported in ball bearings 59, see Fig. 12. The pulleys 61 are vertically spaced and are connected to a belt 62. The lower pulley 61 is coupled with a further pulley 63 which is driven by belt 64 which is interconnected with motor 65 by pulley 66, see Figs. 3 and 11.

The bearing 67 is supported on lower part 37 of carriage 33 in order to impart transverse motion to the carriage 33 relative to the length of the bed on the lathe and in order to impart a longitudinal motion to the portion or cross head 43 thereof relative to the guides 2 and 3. A rotatable shaft with a toothed wheel rim 68 at one end thereof is supported in bearing 67. The wheel rim 68 meshes with the rack 35 of the guiding bar 34 in order to permit relative displacement of the carriage 33. There is mounted on the opposite end of the bearing 67 a further worm gear 69 which meshes with worm gear 70 on the shaft 71, see Figs. 1 and 5. The worm gear 70 is supported within lower part 37 so as to rotate without being axially displaceable in order that when worm gear 70 is rotated upon revolution of shaft 71, the carriage 33 moves in a transverse direction relative to the length of the bed of the lathe.

Referring more particularly to Fig. 1, a belt pulley 72 is mounted at one end of shaft 71. A cog wheel 74 is supported on bearings 105 and on yoke 75 and is coaxial with and spaced from shaft 71. A coupling sleeve 73 which may be moved sideways in either direction extends in the space between shaft 71 and cog wheel 74 and is thereby adapted to connect the shaft 71 with either pulley 72 or cog wheel 74.

Coupling sleeve 73 is held by a yoke 75 which is fastened to support 76. The upper end 77 of the yoke 75 meshes with the chuck 78 on the rod 79. Rod 79 is provided with a pair of opposite stops 80 and 80a which are both adjustable. The rod 79 can be transversely moved through the carriage 33 either mechanically or manually by lever 81 which engages link 82 attached at one end of rod 79. Therefore, actuation of rod 79 displaces sleeve 73 in predetermined directions.

Referring more particularly to the rotating mechanism for shaft 71, belt pulley 72 is actuated through pulley 84 of the transmission system 85 of motor 30 to thereby affect an accelerated transverse motion of carriage 33 relative to the length of the bed. The transmission system is connected by belt 135 to pulley 134 located on one end of motor 30. The cog wheel 74 is driven through the intermediary of a cog wheel 103 by cog wheel 86 which is slowly driven by the toothed wheel rim 88 mounted on shaft 87 which itself is connected to step gear 88a of the transmission system 29 and by belt 100. Thus, the cog wheel 74 affects a relatively slow transverse motion of the carriage 33 while shaping of the blank occurs.

Transmission system 29 is also connected by belt 136 to the pulley 26 which is connected to spindles 6 and 11 in the manner further described below. Shaft 71 is also provided with a sprocket 89 which is connected with sprocket 91 by means of chain 90, see Figs. 1 and 5.

Sprocket 91 is mounted on the transmission system 92 and the sprockets 89 and 91 are driven by two bevel gears 93 upon actuation of hand-wheel 94. This bevel gearing permits the manual displacement of the carriage 33.

The model article 15 is rotatably clamped or held between bearing stock 12 and tailstock 12a on sliding plate 3a. The spindle head 11 is rotatable to thereby impart rotary motion to the model article 15. The sliding plate 3a is connected on the side of tailstock 12a to a pipe 112, see Figs. 2, 4 and 5. The rod 111 is slidable within pipe 112 and is pivoted in slot 109 of a vertical lever 108. The lever 108 is fulcrumed by bolt 107 on the guide 3 and both the shorter upper and longer lower arm of the lever 108 are slotted. The lower arm of the lever is further provided with a scale which permits an adjustment of the length of the blanks 15a which is proportionate to the length of the model article 15.

The carriage 33 is provided with a slotted arm 114, see Fig. 1, which engages transmission bolt 116 mounted within the slot 113 of lever 108. Depending upon the adjustment of the transmission bolt 116 within slot 113, the deflection of the upper part of the lever 108 becomes proportionately smaller or larger and thereby controls the extent of the back and forth movement of the model 115 to reproduce proportionately either shorter or longer copies of the model article.

The means permitting adjustment of the cross head 43 of the shaping means 58 include horizontal guide 50 and guide 51. Guide 51 supports a piece 118 which is adjustably mounted on ball bearings. The piece 118 is provided with an ear 119 on which contact wheel 52 is rotatably mounted. The piece 118, together with contact wheel 52, is adjusted relative to the guide 51 by means of screw 120 and clamps in the same position by a stop or further screw means 121. Respective adjustment of contact wheel 52 in conjunction with counter-contact wheel 48 affects a proportionate shaping or carving of the blanks 15a; that is, this adjustment permits making the blank proportionately wider or narrower than the model article 15.

A guide 122 is securely connected to guide 51 and equipped with a tongue 123 which rests against the plane inner side of lever 124, see Figs. 5, 7, 8, 9 and 10. The lower end of lever 124 is connected with an extension 125 of the lower part 37 of the carriage 33 through a pivot 126. The guide 50 is provided with a U-shaped extension guide 127 which is adapted to receive therein the upper part of the lever 124. Both jaws of guide 127 are equipped with a bearing 128 which forms a fulcrum for lever 124 by means of pivots 129 to thereby directly connect guide 51 to lever 124. The tongue 123 forms together with guide 51 an integral part which can be vertically adjusted within guide 122 by rotating crank 131. Guide 122 is provided on the surface thereof with a scale 132. The vertical adjustment of tongue 123 controls the width ratio of the blanks 15a relative to the model article 15 since the lever 124 which moves continuously back and forth controls the respective deflection of the cross head 43. The larger the deflection, the higher the pivot 129.

The contact wheel 52 follows the surface or contour of the model article 15 and transmits this contour to shaping means 58 through the engagement of tongue 123 with lever 124. Obviously, piece 118 together with the tongue 123 is securely fastened for motion with lever 124 by means of spring 133, see Fig. 10.

The copying lathe constructed according to this invention operates as follows:

Motor 30 drives through cog wheel 95 intermediate shaft 96 located within housing 1. The one end of shaft 96 extends outside the housing and is provided with a transmission wheel 97, see Figs. 1 and 3, meshing with cog wheel 98. Cog wheels 97 and 98 are interchangeable in order to vary the transmission ratio between motor 30 and wheel 74. A shaft extending from wheel 98 to the inside of the housing 1 is provided with a belt pulley 99 for belt 32 which drives transmission system 29. Outside of the housing 1 the transmission system 29 drives pulleys 88a by means of belt 100 and pulley 26 by means of belt 136. Pulleys 88a are supported within bearing block 102 by a shaft 87 which is provided with a toothed wheel 88 which drives transmission system 86 including toothed wheel 103 which drives cog wheel 74.

Cog wheel 74 is loosely journalled on shaft 71 and drives this shaft only when coupling sleeve 73 is engaged therewith when shifting lever 81 moves steering rod 79 to a predetermined position.

The cross head 43 is equipped with a stop 138, see Fig. 7, which permits locking the cross head so that the shaping means 58 will not abut the blanks 15a. When stop 138 is released, the contact wheel 52 and the counter-contact wheel 48 are pressed against the model article 15. The shaping means 58 is driven by second motor 65 through belts 64, 62. Shaft 71 which is embedded in the bearing supports 104, 105 is rotated by worm 70 which is axially displaceable on shaft 71 although adapted by a key to rotate simultaneously with the shaft 71. Worm 70 drives a worm gear 69 to rotate gear 68 engaging rack 35 to thereby displace carriage 33.

Obviously, accelerated or reverse motion of the carriage 33 occurs when motor 30 drives the transmission system 85 including belt 135 by means of pulley 134. This transmission system further includes a pulley 84 which drives the pulley 72 by means of cross belt 85.

Again, shaft 71 is engaged or dis-engaged with respect to pulley 72 by pre-positioning coupling sleeve 73 through shifting lever 81. When shaft 71 is engaged with pulley 72, the carriage 33 moves to the left until it abuts stop 80 fastened on steering rod 79 whereupon steering rod 79 is displaced to the left thereby dis-engaging coupling sleeve 73 from shaft 71 while engaging coupling sleeve 73 with cog wheel 74 to thereby rotate shaft 71 in the opposite direction and move the carriage automatically in the reverse direction, to the right, until the carriage abuts stop 80a whereupon steering rod 79 is again moved and coupling sleeve 73 is dis-engaged from cog wheel 74 and once again engaged with pulley 72. Obviously, pulley 72 rotates shaft 71 faster than cog wheel 74 so that carriage 33 moves to the left more rapidly than when it is moved to the right. If necessary, carriage 33 may be moved manually in either direction through hand-wheel 94, bevel gears engaging sprocket 91, chain 90, and sprocket 89 on shaft 71.

The drive mechanism for the model article and for the blanks includes driving motor 30 which actuates transmission system 29 through elements 95, 96, 97, 98, 99, 32 and 28. Transmission system 29 actuates by means of belt 136 the coupling flange 26. Coupling flange 26 normally idles on coupling shaft 21 (see Fig. 1) and is engageable with a coupling sleeve 26a by means of lever 27, see Figs. 1, 3 and 4. Lever 27 includes a yoke 27a engaging with coupling sleeve 26a. When coupling sleeve 26a and coupling flange 26 are engaged, shaft 21 is rotated to thereby also rotate helical gear 20. Gear 20 is connected to gear 19 which is mounted intermediate the ends of shaft 18.

Referring more particularly to Fig. 6, when worm gear 19 is rotated, the worms 17 at the opposite ends thereof are also rotated and thereby drive the worm gears 16 and the spur gears 5 to thereby simultaneously impart rotation to the model article and the blanks, respectively.

When the blanks are to be shaped to either a smaller or a larger dimension than the model article, the engagement of the contact wheel 52 with the model article 15 affects a proportionate displacement of cross head 43 by the adjustment of tongue 123 relative to lever 124 through spindle 131 (see Fig. 7).

The sliding plate 3a is interconnected and moves in conjunction with carriage 33 through elements 114, 116, 108, 109, 111 and 112. Obviously, when the fulcrum 107 of lever 108 is displaced, the upper part of the lever 108 moves through a proportionately varying angle. Therefore, pivot 110 moves a varying distance and transmits through the rod 111 and pipe 112 a proportionately varying motion to the sliding plate 3a. It is thus possible to alter the ratio of the lever arms 111, 112 and 108 so that the model article moves along a path proportionately smaller or greater than the path of the carriage to thereby shape the blanks accordingly since the latter are fixedly mounted on the bed of the lathe. It is noted that the end 113 of lever 108 is connected at pivot 116 to plate 114 which is secured to carriage 33.

Although one specific embodiment of the invention has been described and shown in the drawings, it should be noted that the invention may be realized in modified form and adaptations of the arrangements herein disclosed may be made, as may readily occur to persons skilled in the art without constituting a departure from the spirit and scope of the invention as defined in the objects and in the appended claims.

Having thus described the invention, what is claimed as new and desired to be secured by Letters Patent, is:

1. In a lathe having a bed for copying at least one blank from a model article; shaping means for working said blank, support means for said shaping means, respective means for rotatably holding said blank and said model article, drive means for simultaneously rotating said holding means for said model article and said holding means for said blank, said support means being reciprocably and transversely movable with respect to the length of said bed and being provided with a longitudinally and reciprocably movable upper portion, sensing means engageable with said model article and operatively connected for movement with said upper portion for controlling the motion thereof, whereby said shaping means may be displaced along a path determined by the movement of said sensing means, plate means for carrying said model article and connected to said bed for transverse movement relative thereto, adjustable actuating means operatively connected from said support means to said plate means for progressively moving said plate means in transverse direction to said bed at predetermined speed relative to said support means, whereby said plate means and said model article when carried thereby are displaced relative to said bed and said blank, said blank being worked by said shaping means for reproduction of said model article on predetermined scale.

2. In a lathe according to claim 1, said drive means including a plurality of gear means rotating in opposite directions, and connecting means on said support means successively engageable with one of said gear means whereby said support means is automatically reciprocably movable.

3. In a lathe according to claim 2, said drive means being provided with means for controlling the speed of rotation of said gear means, whereby said support means is moved in opposite directions at predetermined speeds.

4. In a lathe according to claim 1, said support means including control means, whereby the longitudinal motion of said portion is adjustable to thereby work the width of the blank so that it is proportional to the width of the model article.

5. In a lathe according to claim 1, including lever means pivotally connected to said support means, guide means operatively connected to said sensing means and terminating in a tongue cooperating with said lever means, and means for varying the position of said lever means relative to said tongue, so that the longitudinal motion of said portion can be varied relative to said sensing means, whereby said blank is worked by said shaping means for reproduction of said model article on predetermined scale of breadth.

References Cited in the file of this patent

UNITED STATES PATENTS

| | | |
|---|---|---|
| 723,044 | Seymour | Mar. 17, 1903 |
| 1,277,203 | Ensign | Aug. 27, 1918 |
| 1,294,500 | Lyons | Feb. 18, 1919 |
| 1,363,238 | Duchemin | Dec. 28, 1920 |
| 1,716,672 | Topham | June 11, 1929 |